United States Patent [19]
Braconier

[11] Patent Number: 5,137,674
[45] Date of Patent: Aug. 11, 1992

[54] METHOD OF MANUFACTURING MULTIPART REINFORCED GASKETS

[75] Inventor: Karl Braconier, East Hebron, N.H.

[73] Assignee: Freudenberg-NOK General Partnership, Plymouth, Mich.

[21] Appl. No.: 641,536

[22] Filed: Jan. 15, 1991

[51] Int. Cl.$^5$ .............................. B29C 45/14
[52] U.S. Cl. .................. 264/161; 264/160; 264/273; 264/275; 264/297.4
[58] Field of Search ............ 264/273, 297.4, 160, 264/275, 160, 161; 277/235 A, 209, 211, DIG. 10

[56] References Cited

U.S. PATENT DOCUMENTS

| | | | |
|---|---|---|---|
| 3,191,950 | 6/1965 | Hiltner | 277/211 |
| 3,738,670 | 6/1973 | Jelinek et al. | 277/199 |
| 4,690,413 | 9/1987 | Adkins | 277/DIG. 10 |

FOREIGN PATENT DOCUMENTS 0320826 6/1989 European Pat. Off. ........ 277/235 A
2231374 11/1990 United Kingdom ........... 277/235 B

*Primary Examiner*—James Lowe
*Attorney, Agent, or Firm*—Dinnin & Dunn

[57] ABSTRACT

This invention deals with a multipart structurally reinforced gasket product, suitable for use in V-8, V-6, straight 6 and straight 4 automotive engines or the like, said gasket product being made of a plurality of interconnected nested reinforced gaskets, each gasket including an inner reinforcing means (preferably made of a metal stamping) for providing shape, positioning, and strength to the gasket, and, a molded elastomeric material formed around said reinforcing means, said plurality of interconnected gaskets being held in interconnected relationship, prior to actual usage, by shearable connector means which function to assist in holding the reinforcing means in proper position when the elastomeric material is being molded onto the reinforcing means; and, said elastomer portion of the gasket being made of a compound which preferably possession a shore A durometer of 60 (plus or minus 5).

7 Claims, 3 Drawing Sheets

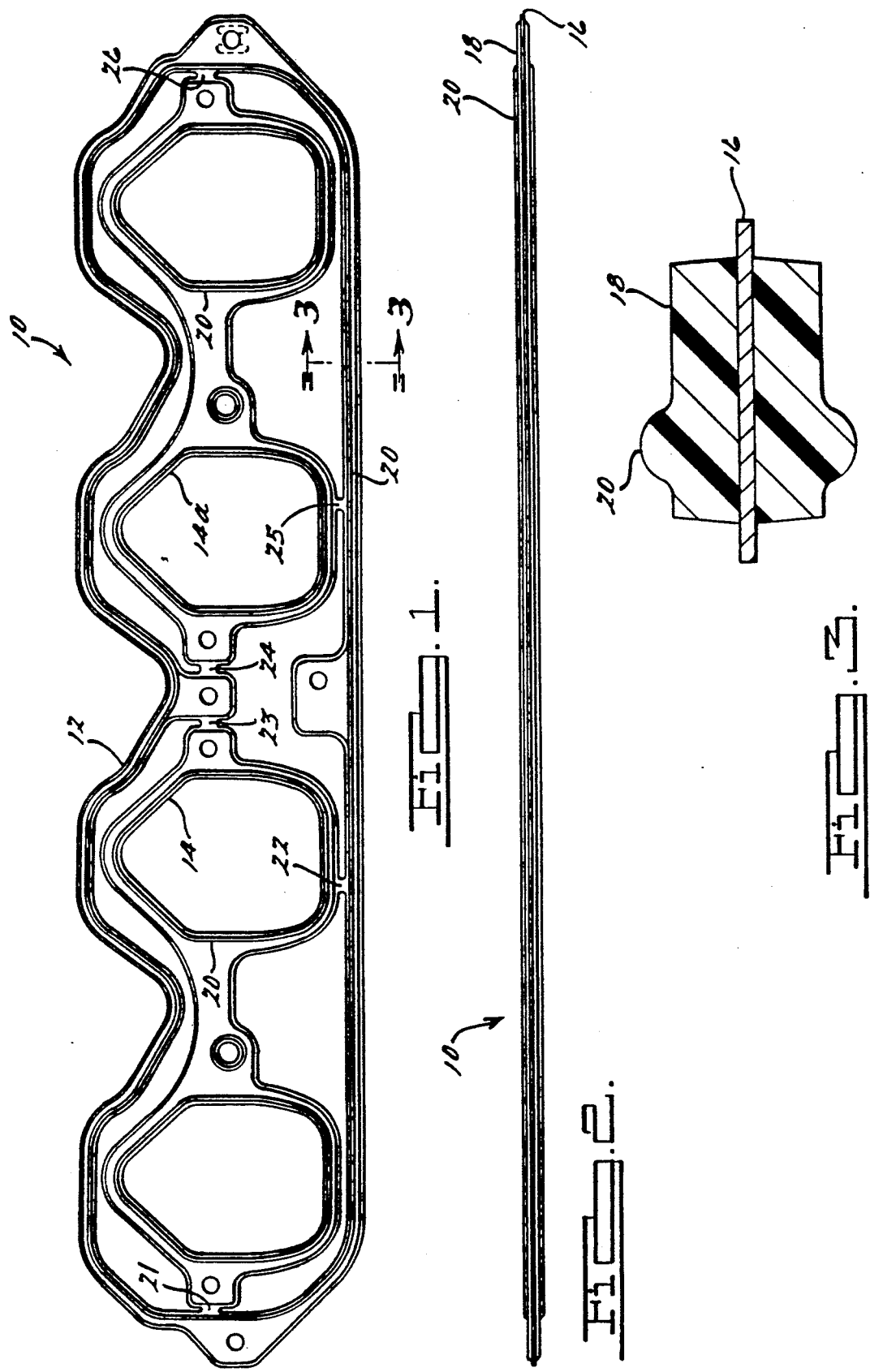

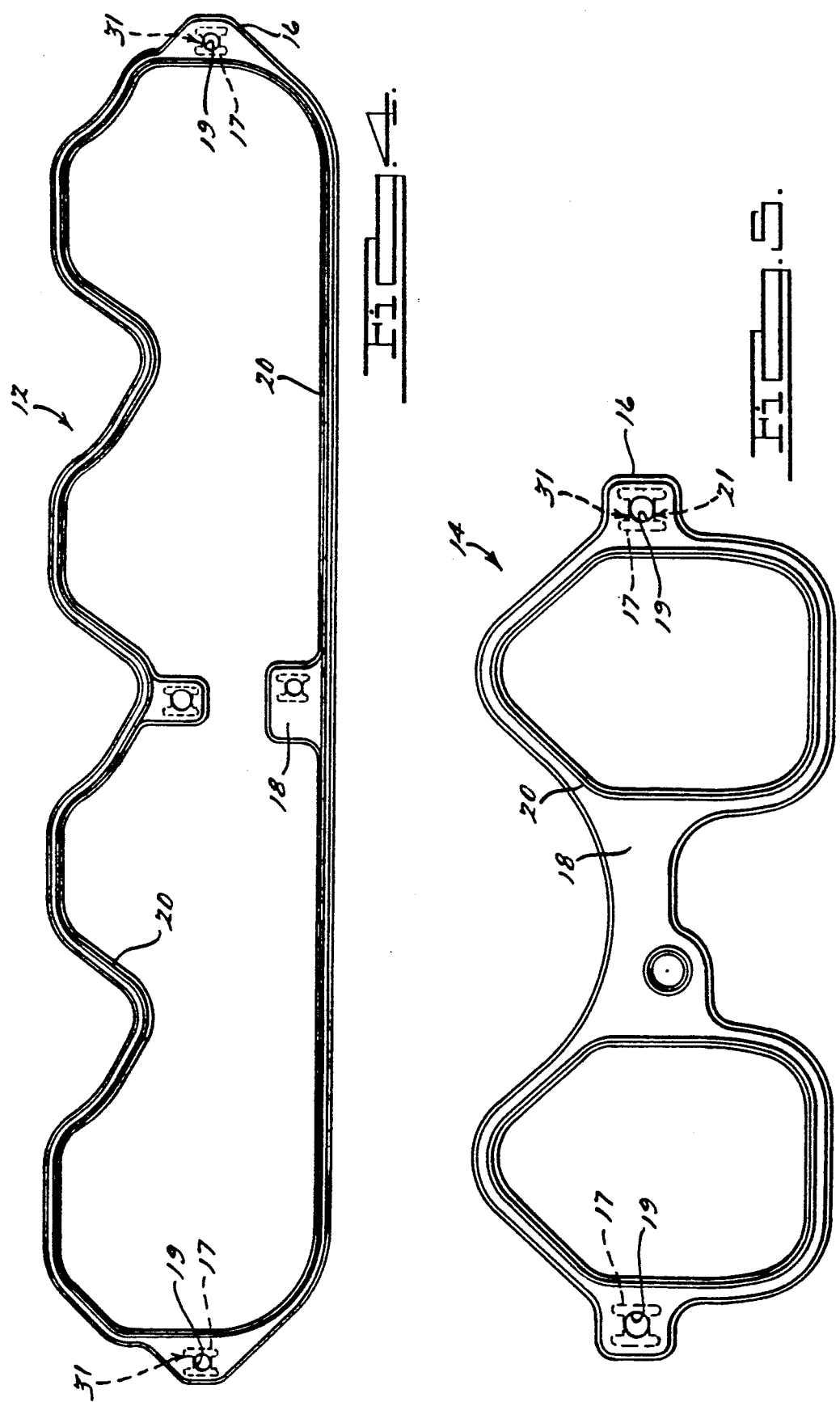

METHOD OF MANUFACTURING MULTIPART REINFORCED GASKETS

BACKGROUND OF THE INVENTION

This invention broadly relates to a new gasket product and its method of manufacture. More specifically, this invention relates to a multipart structurally reinforced gasket product suitable for use in automotive engines or the like.

The state of the art is indicated by the following cited references: Balfe U.S. Pat. No. 2,121,004; Conners U.S. Pat. No. 2,289,409; and France Patent No. 675,873 (Societe Gaslock).

In connection with gasket products used in automotive engines, particularly gasket products which are of relatively complex shape and design, such gasket products over the last several years have become relatively expensive to produce. Accordingly those skilled in the art have long sought an economical and efficient way to produce such gasket products. In the past, there have occurred particular problems in the area of advantageously and economically producing such products to be used for gasketing and/or sealing the upper and lower inlet surfaces (e.g., for the inlet manifolds) of advanced automotive engine systems.

Accordingly, one object of this invention is to provide a novel gasket product which is economical to produce and which can be used in connection with sealing the manifolds of automotive engines.

Another object of the present invention is to provide a novel multipart structurally reinforced gasket product.

Another object of the present invention is to provide a novel method of manufacturing a multipart structurally reinforced gasket product.

Other objects, features and advantages of the present invention will become apparent from the subsequent description and the appended claims, taken in connection with the accompanying drawings (wherein like numerals indicate like elements).

BRIEF DESCRIPTION OF THE DRAWINGS

FIG. 1 is a top plan view of a multipart gasket product in accordance with the invention;

FIG. 2 is a side view of the gasket product of FIG. 1;

FIG. 3 is a cross sectional view taken through the section 3—3 shown in FIG. 1;

FIG. 4 is a gasket in accordance with the invention;

FIG. 5 is also a gasket in accordance with the invention;

SUMMARY OF THE INVENTION

Figure 6:
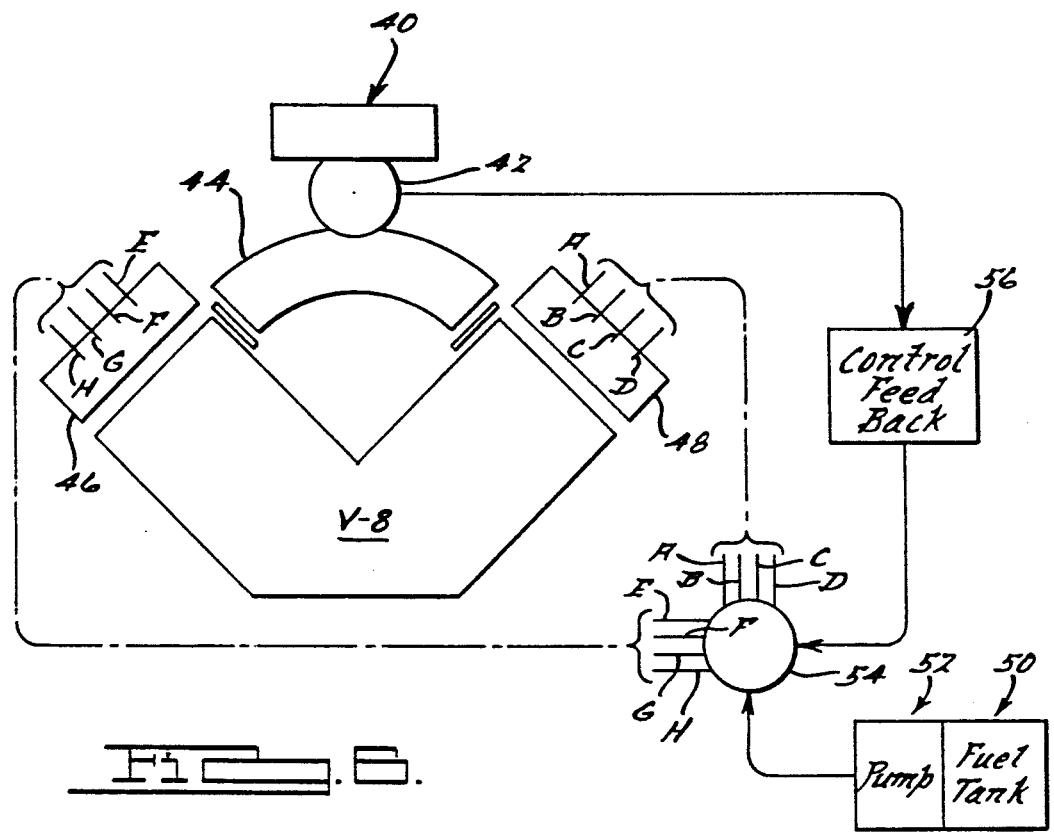
FIG. 6 is a schematic diagram of a V-8 automotive engine assembly which is shown for purposes of illustrating the application usages of the invention; and, FIG. 7 is a schematic diagram of a V-8 automotive engine assembly, similar to that of FIG. 6, but illustrating different embodiment.

Briefly stated, the present invention comprises a multipart structurally reinforced gasket product, suitable for use in automotive engines or the like, comprised of: a plurality of interconnected nested reinforced gaskets, each gasket including an inner reinforcing means for providing shape, positioning, and strength to the gasket, and said reinforcing means being made of a material selected from the group consisting of metal or plastic, and molded elastomeric material formed around said reinforcing means, said plurality of interconnected gaskets being held in interconnected relationship, prior to actual usage, by shearable connector means which function to assist in holding the reinforcing means in proper position when the elastomeric material is being molded on to the reinforcing means.

DESCRIPTION OF PREFERRED EMBODIMENTS

FIG. 1 illustrates a gasket product 10 in accordance with the invention. The gasket product 10 is comprised of interconnected nested together gaskets 12, 14, and 14a. Gasket 12 is shown in FIG. 4 and, gasket 14 (and 14a which is of identical construction) is illustrated in FIG. 5. The gasket product 10 is formed from a structural reinforcing member 16 preferably made from a metal stamping, but which may alternatively be made from a plastic reinforcing member as well. The reinforcing member 16 has molded thereover a rubber or elastomeric compound 18 which includes a bead portion 20 to act as the sealing bead surface of the gaskets when placed in application usage.

The interconnected gaskets shown in the gasket proudct 10 of FIG. 1 are held in nested position, prior to actual application usage, by the six interlocking support points 21, 22, 23, 24, 25 and 26 shown in FIG. 1. These support points or shear points 21–26 are sheared or cut to separate the interconnected gaskets 12, 14 and 14a prior to application usage of the gaskets; for example, in an automotive engine for purposes of sealing upper and lower inlet surfaces between manifold and head.

FIG. 6 shows a schematic illustration of a V-8 automotive engine system, for example, comprised of an air cleaner 40, fuel metering system 42, intake manifold 44, and cylinder heads 46 and 48. Typically, the V-8 engine system shown in FIG. 6 was operated by fuel or gasoline from the tank 50 being supplied via pump means 52 to a fuel distributor 54, which fuel distributor 54 would dispense the fuel via the eight lines designated A, B, C, D, E, F, G and H to corresponding respective ports near the cylinder heads 46 and 48 for each cylinder of the V-8 engine. Distribution of the proper amounts of the fuel to the V-8 engine system in FIG. 6, in the past, has been controlled (using automotive technology not part of this application) by the fuel metering system 42 which provides control feedback information via the control feedback to the fuel distribution means 54.

Figure 7:
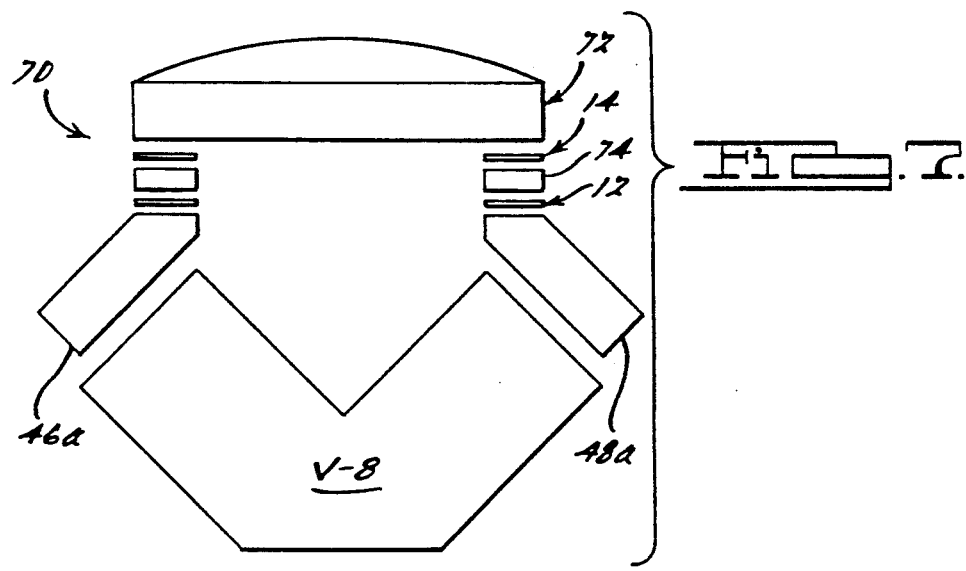

Advancements in engine technology, over the last several years, have resulted in a V-8 engine system of the type shown schematically in FIG. 7, designated by the numeral 70. In the V-8 engine system shown in FIG. 7, fuel metering system 42, control feedback 56, intake manifold 44, and fuel distributing system 54 (all as previously shown in FIG. 6) have been combined into a cast magnesium plenum or intake chamber designated 72 (in FIG. 7). This intake plenum 72 shown in the V-8 engine system of FIG. 7 houses the complete induction and/or fuel injection system for the V-8 engine. The V-8 engine of FIG. 7 also includes the cylinder heads 46a and 48a which have associated therewith the gasket 12 which is mounted below the phenolic distribution plate 74; and, then above the phenolic distribution plate 74 there is mounted the two gasket elements 14 and 14a.

The technical advantages of the invention herein result in a combination of product design and process that is capable of producing more than one structurally reinforced gasket, by utilizing portions of the insert that would normally be waste and portions of the mold that would normally be non-functional. The advantages of this new gasket prouduct design may be utilized through the usage of a metal stamping as the underlying structural reinforcing member, however it is also possible and applicable to use a plastic member as the underlying structural reinforcing member. The improvements to the fabrication and assembly of gasket products using the developments as described herein are set forth below.

(1) For the insert or metal stamping 16, the portion that is normally scrap is now used to form a second insert (i.e., the insert support for gasket 14, and 14a) without further handling. Typically the piece stamped out of the middle of the insert is waste. With the improved design and modification to the die, it becomes an additional insert for another part. The stamping die (or plastic mold) becomes somewhat more complex, but the overall advantages of the invention are quite significant.

(2) The insert 16, of metal or plastic, when loaded into the mold, needs only to be registered with the mold by means of just one of the inserts as the others are interconnected and nested therewithin through usage of the interconnecting points (21, 22, 23, 24, 25 and 26). Only one unit need be loaded per cavity, though two or more components are being molded simultaneously. With past designs, there would be location needed on each individual insert, thereby increasing the probability of mis-location and making the individual inserts more complex.

(3) The gasket product is then molded and trimmed as one unit (gasket product 10 in FIG. 1). All handling and inspection is conducted on the single part as a unit.

(4) The runner systems and sprues for the rubber compound or elastomeric material (as well as the plastic) are now reduced by as much as half because the inner and outer parts are filled by one runner system. Past designs of this nature would require more sprues (because of the long distances the material has to flow and the small cross section which it flows through) therefore increasing waste. Each individual part (e.g. gaskets 14, 14a) would in the past have required their own sprues.

(5) Packaging and shipping can also be cut in half as there is no need to separate the parts from each other (in most cases) until sub-assembly or final assembly. At this assembly stage, the single unit (gasket product 10) becomes the finished parts (gaskets 12, 14, 14a) by shearing or die cutting at the points designated (on gasket product 10 at the six positions 21 to 26) for assembly.

Note also, another feature of the invention, that the gaskets 12 and 14 (see FIGS. 4-5) have reinforcing members 16 which include "H" shaped cut-outs designated 17, with the circular shaped aperture elastomer holes 19 molded thereover. The projecting edges 31 of the H cut-outs rub against or mate with pins or carrier piece locaters (not shown) when the gaskets are put into application usage.

Another unique feature of the invention relates to the concept that the H shaped cut-outs or locator holes are positioned and designed into the backbone of the gaskets 12, 14 14a. This makes it possible when the gaskets are used for sealing (e.g. with phenolic distribution plates 74 which expand at different rates under hot/cold temperature cycles, versus metallic engine components), that the H shaped locator means will still function to properly position the gaskets relative to the phenolic distribution plates used in an automotive engine.

Still another unique feature relating to the invention concerns the usage of stainless steel as the preferred metal for the stamping or reinforcing insert 16. This enables the gasket product to have significantly increased resistance to corrosion, and is highly desirable in advanced automotive engine technology. Old gasket products often used carbon steel reinforcement where the waste could be disposed of without significant economic loss, which is not so when the considerably more expensive stainless steel is required for the reinforcing insert. Thus the gasket product 10 of this invention enables the economical production of a stainless steel reinforced gasket.

The Shore A durometer for the rubber compound or elastomer 18 used in this invention should broadly be within the range of about 50 to about 70, and preferably within the range of about 55 to about 65.

While it will be apparent that the preferred embodiments of the invention disclosed are well calculated to fulfill the objects, benefits, and advantages of the invention, it will be appreciated that the invention is susceptible to modification, variation and change without departing from the proper scop or fair meaning of the subjoined claims

What is claimed is:

1. A method of manufacturing a multipart structurally reinforced gasket product comprised of, a plurality of interconnected nested reinforced gaskets, each gasket including an inner reinforcing means for providing shape, positioning, and strength to the gasket, and said reinforcing means being made of a material selected from the group consisting of metal and plastic; and, molded elastomeric material formed around said reinforcing means, said plurality of interconnected gaskets being held in interconnected relationship, prior to actual usage, by shearable connector means which function to assist in holding the reinforcing means in proper position when the elastomeric material is being molded on to the reinforcing means, said method comprising the steps of:

forming a unitary reinforcing means for the gasket product, which reinforcing means has nested together reinforcing members at a plurality of shearable connector points, placing said unitary reinforcing means in a mold, registering the reinforcing means within the mold by means of locating apertures in the reinforcing means, molding an elastomeric material over the reinforcing means to form the nested together gaskets of the product, removing the molded gasket product from the mold, and trimming the excess elastomeric material from the product.

2. The method of claim 1 wherein, said reinforcing means made of metal.

3. The method of claim 1 wherein, said reinforcing means made of plastic.

4. The method of claim 1 wherein, said reinforcing means made of stainless steel.

5. The method of claim 1 wherein, said reinforcing means is made of stainless steel, and the molded elastomeric material of the gasket product has a durometer value in the range of about 50 to about 70.

6. A method of manufacturing a multipart structurally reinforced gasket product comprised of, a plurality of interconnected nested reinforced gaskets, each gasket including an inner reinforcing insert for providing shape, positioning, and strength to the gasket, and molded elastomeric material formed around the reinforcing inserts, the plurality of interconnected nest reinforced gaskets being held in interconnected relationship, prior to actual usage, by shearable connector points, said method comprising the steps of:

forming a unitary reinforcing means for the gasket product, which reinforcing means has nested together reinforcing inserts having a plurality of generally H-shaped cut-outs, placing said unitary reinforcing means in a mold, registering the reinforcing means within the mold by means of locating apertures in the reinforcing means, molding an elastomeric material over the reinforcing means to form the nested together gaskets of the product and generally circular shaped apertures at the H-shaped cut-outs, removing the molded gasket product from the mold, and trimming the excess elastomeric material from the product.

7. A method of manufacturing a multipart structurally reinforced gasket product comprised of, a plurality of interconnected nested reinforced gaskets, each gasket including an inner reinforcing insert for providing shape, positioning, and strength to the gasket, and molded elastomeric material formed around the reinforcing inserts, the plurality of interconnected nest reinforced gaskets being held in interconnected relationship, prior to actual usage, by shearable connector points, said method comprising the steps of:

forming a unitary reinforcing means for the gasket product, which reinforcing means has nested together reinforcing inserts at a plurality of shearable connector points and having a plurality of generally H-shaped cut-outs, placing said unitary reinforcing means in a mold, registering the reinforcing means within the mold by means of locating apertures in the reinforcing means, molding an elastomeric material over the reinforcing means to form the nested together gaskets of the product and generally circular shaped apertures at the H-shaped cut-outs, removing the molded gasket product from the mold, and trimming the excess elastomeric material from the product.

* * * * *